United States Patent
Zhang

(10) Patent No.: US 9,498,082 B2
(45) Date of Patent: Nov. 22, 2016

(54) SELF-CLEANING MILK FOAMING DEVICE

(71) Applicant: Tsann Kuen (Zhangzhou) Enterprise Co., Ltd., Zhangzhou (CN)

(72) Inventor: Yan-Xiang Zhang, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 173 days.

(21) Appl. No.: 14/504,576

(22) Filed: Oct. 2, 2014

(65) Prior Publication Data

US 2015/0097303 A1    Apr. 9, 2015

(30) Foreign Application Priority Data

Oct. 8, 2013 (CN) .................... 2013 2 0617674 U

(51) Int. Cl.
| | |
|---|---|
| *B01F 3/04* | (2006.01) |
| *A47J 31/60* | (2006.01) |
| *B01F 5/04* | (2006.01) |
| *A23G 1/10* | (2006.01) |
| *A47J 31/44* | (2006.01) |

(52) U.S. Cl.
CPC ............... *A47J 31/60* (2013.01); *A23G 1/105* (2013.01); *A47J 31/4485* (2013.01); *A47J 31/4489* (2013.01); *B01F 3/04446* (2013.01); *B01F 3/04815* (2013.01); *B01F 5/0413* (2013.01); *B01F 2003/04943* (2013.01); *B01F 2215/0006* (2013.01)

(58) Field of Classification Search
CPC .. B01F 3/04; B01F 3/04099; B01F 3/04446; B01F 3/04815; B01F 5/0413; A23G 1/105; A47J 31/44; A47J 31/4485
USPC .................... 261/30; 99/323.1; 426/474, 476
See application file for complete search history.

(56) References Cited

U.S. PATENT DOCUMENTS

| | | | |
|---|---|---|---|
| 7,448,314 B2 * | 11/2008 | Ioannone | A47J 31/4485 134/22.12 |
| 2011/0100230 A1 * | 5/2011 | Cheng | A47J 31/4485 99/293 |

FOREIGN PATENT DOCUMENTS

| | | |
|---|---|---|
| EP | 2272408 A1 | 1/2011 |
| WO | 2012107357 A1 | 8/2012 |

* cited by examiner

*Primary Examiner* — Robert A Hopkins
(74) *Attorney, Agent, or Firm* — Husch Blackwell LLP

(57) ABSTRACT

A self-cleaning milk foaming device includes a mixing unit, a steam jet unit and a control unit. The mixing unit has a mixing chamber, and a milk inlet passage, a cleaner inlet passage and a foaming gas inlet passage communicated with the mixing chamber. The mixing chamber has a milk outlet nozzle, an upstream section, and a downstream section disposed between the upstream section and the milk outlet nozzle. The milk inlet passage is situated between the cleaner inlet passage and the milk outlet nozzle. The foaming gas inlet passage is disposed upstream of the milk inlet passage. The steam jet unit is for supplying steam into the mixing chamber. The control unit is for controlling the cleaner to flow or to stop flowing into the cleaner inlet passage.

12 Claims, 5 Drawing Sheets

SELF-CLEANING MILK FOAMING DEVICE

CROSS-REFERENCE TO RELATED APPLICATION

This application claims priority of Chinese Application No. 201320617674.7, filed on Oct. 8, 2013.

FIELD OF THE INVENTION

The invention relates to a foaming device, more particularly to a self-cleaning milk foaming device.

BACKGROUND OF THE INVENTION

Coffee oftentimes comes with milk foam. Conventional milk foaming devices may be individually set up, or be integrated into automated coffee machines. At present, for cleaning purposes, the aforementioned milk foaming devices have to be dissembled beforehand, which is rather inconvenient, usually leading to periodic cleaning at relatively long time intervals. However, milk accumulated therein for such a long period is easily spoiled and generates a lot of germs, thereby raising hygienic concerns.

SUMMARY OF THE INVENTION

Therefore, the object of the present invention is to provide a self-cleaning milk foaming device that can eliminate the abovementioned drawback associated with the prior art.

Accordingly, a self-cleaning milk foaming device of the present invention includes a mixing unit, a steam jet and a control unit. The mixing unit includes a mixing chamber for mixing steam, milk and a foaming gas, a milk inlet passage that is fluidly communicated with the mixing chamber for inputting the milk into the mixing chamber, a cleaner inlet passage that is fluidly communicated with the mixing chamber in proximity to the milk inlet passage for inputting a cleaner into the mixing chamber, and a foaming gas inlet passage that is fluidly communicated with the mixing chamber. The mixing chamber has a milk outlet nozzle for outputting a foamed milk, an upstream section that is distal from the milk outlet nozzle, and a downstream section that is disposed between the upstream section and the milk outlet nozzle. The milk inlet passage is situated between the cleaner inlet passage and the milk outlet nozzle. The foaming gas inlet passage is disposed at an upstream side of the milk inlet passage distal from the milk outlet nozzle. The steam jet unit is removably connected to the mixing unit, and includes a steam outlet nozzle that is fluidly communicated with the mixing chamber for supplying steam into the mixing chamber. The control unit is coupled to the steam jet unit and includes a cleaner control valve for controlling the cleaner to flow or to stop flowing into the cleaner inlet passage.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
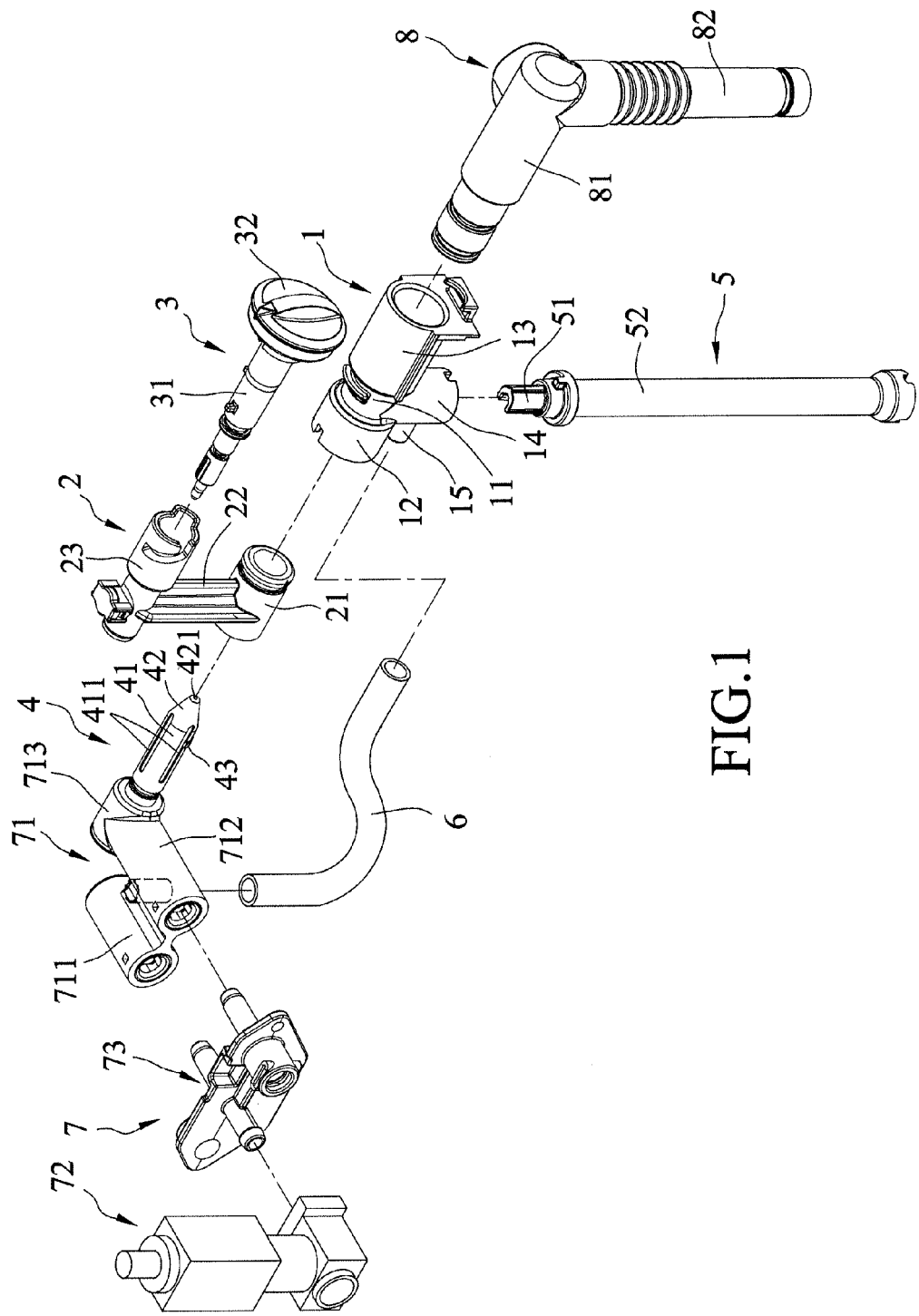
FIG. 1 is an exploded perspective view of an embodiment of a self-cleaning milk foaming device according to the invention.
Figure 2:
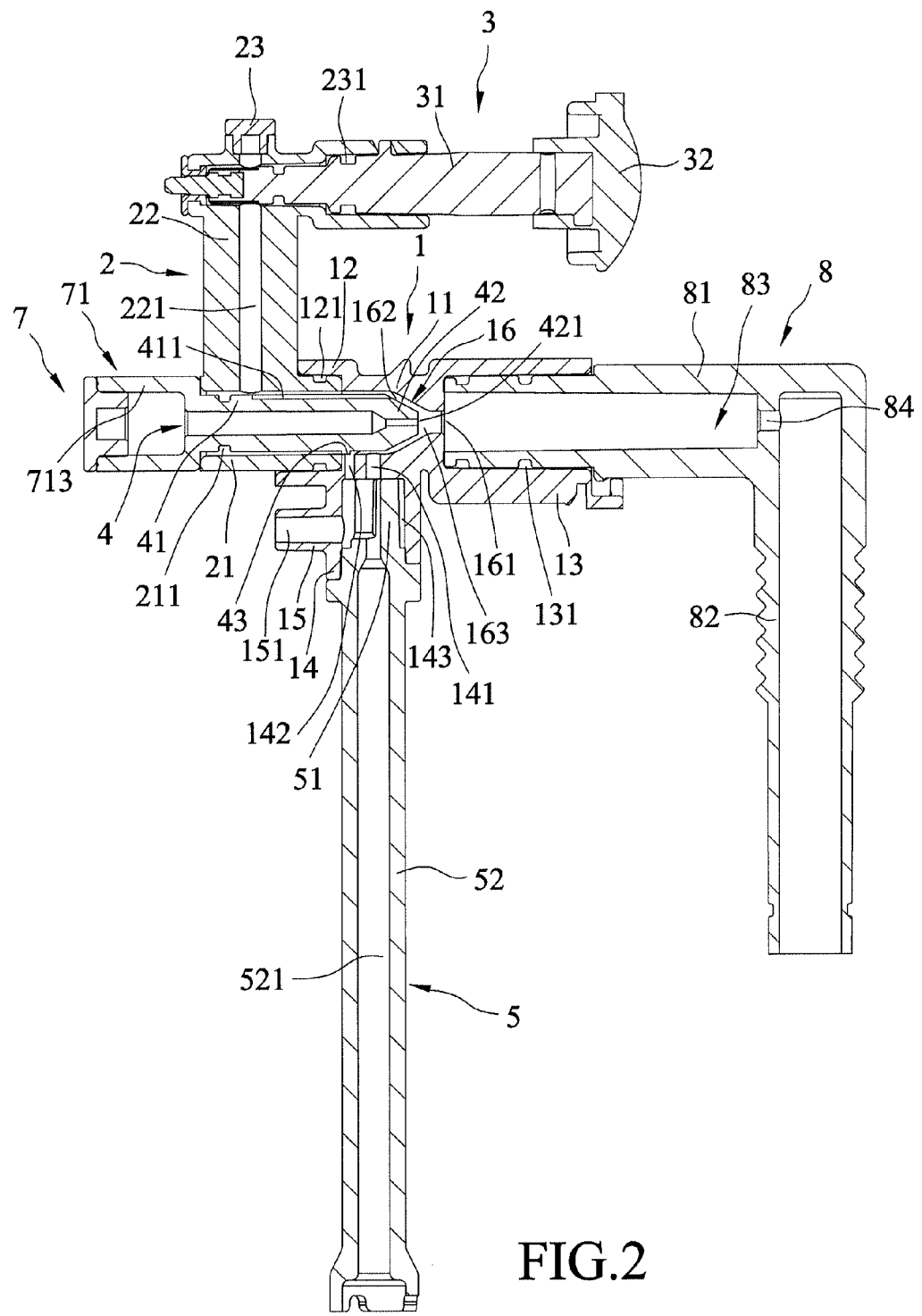
FIG. 2 is a fragmentary sectional view of the embodiment.
Figure 3:
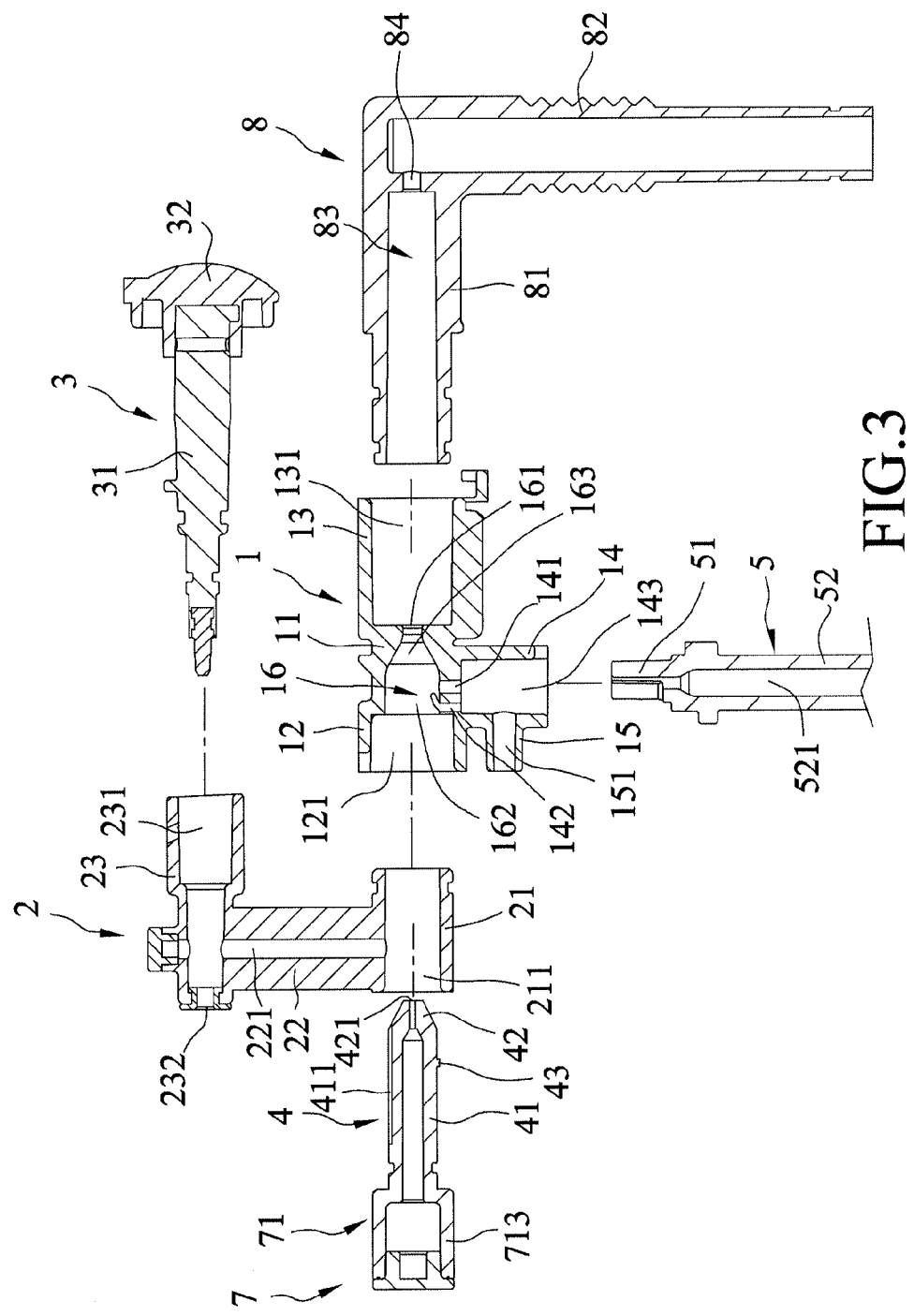
FIG. 3 is a fragmentary exploded sectional view of the embodiment.

Referring to FIGS. 1 to 3, the embodiment of a self-cleaning milk foaming device according to the present invention is shown to be adapted for mixing steam and a foaming gas for foaming milk, and adapted to be cleaned using a cleaner. The foaming gas and the cleaner used in this embodiment are ambient air. The self-cleaning milk foaming device includes a mixing unit 1, a foaming gas supply unit 2, a foaming gas control valve 3, a steam jet unit 4, a suction unit 5, a cleaner supply pipe 6, a control unit 7 and a discharge unit 8.

The mixing unit 1 has a main body portion 11, a foaming gas inlet portion 12 and a foaming portion 13 that are spaced apart from each other and that are connected respectively to opposite ends of the main body portion 11, an inlet portion 14 extending downwardly from a bottom of the main body portion 11 between the foaming gas inlet portion 12 and the foaming portion 13, and a sideward tubular portion 15 extending from the inlet portion 14.

The main body portion 11 defines a mixing chamber 16 for mixing steam, milk and a foaming gas. The mixing chamber 16 has a milk outlet nozzle 161 for outputting a foamed milk which is a mixture of the steam, the milk and the foaming gas, an upstream section 162 that is distal from the milk outlet nozzle 161 in a horizontal direction, and a downstream section 163 that is disposed between the upstream section 162 and the milk outlet nozzle 161. The downstream section 163 is converged from the upstream section 162 to the milk outlet nozzle 161.

The foaming gas inlet portion 12 defines a foaming gas inlet passage 121 that is fluidly communicated with and disposed upstream of the upstream section 162 for inputting the foaming gas into the mixing chamber 16.

The foaming portion 13 defines a foaming chamber 131 that is in fluid communication with and disposed downstream of the milk outlet nozzle 161 (i.e., the milk outlet nozzle 161 is interposed between the downstream section 163 and the foaming chamber 131). The foaming chamber 131 is larger in width than the milk outlet nozzle 161.

Figure 4:
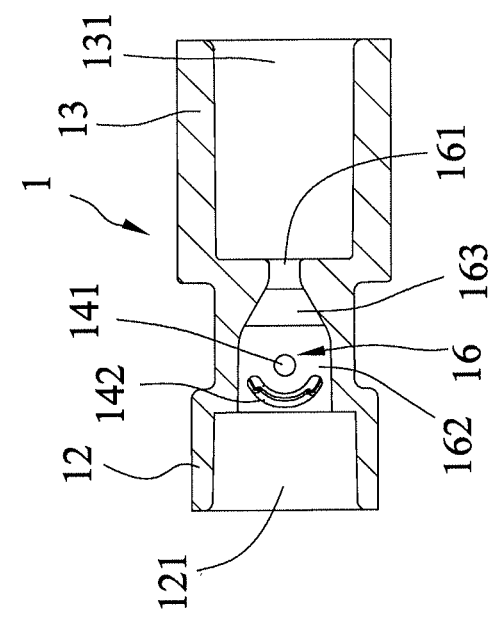
FIG. 4 is a sectional view of a mixing unit of the embodiment.

Referring to FIGS. 2 to 4, the inlet portion 14 defines a milk inlet passage 141 that is fluidly communicated with the upstream section 162 of the mixing chamber 16 for inputting the milk into the mixing chamber 16, a cleaner inlet passage 142 that is fluidly communicated with the upstream section 162 of the mixing chamber 16 in proximity to the milk inlet passage 141 for inputting a cleaner into the mixing chamber 16, and a downward tubular passage 143 beneath the mixing chamber 16. Both of the milk inlet passages 141 and the cleaner inlet passage 142 are disposed between the mixing chamber 16 and the downward tubular passage 143 and have respective bottom ends fluidly and directly connected to the downward tubular passage 143. The milk inlet passage 141 is situated between the cleaner inlet passage 142 and the milk outlet nozzle 161 of the mixing chamber 16, and the cleaner inlet passage 142 is situated between the foaming gas inlet passage 121 and the milk inlet passage 141. The milk inlet passage 141 is cylindrical, and the cleaner inlet passage 142 is arcuated around the milk inlet passage 141

(see FIG. 4). The foaming gas inlet passage 121 is disposed at an upstream side of the milk inlet passage 141 distal from the milk outlet nozzle 161. Such design enlarges the cleaner inlet passage 142 as much as possible in a limited structure of the main body portion 11 of the mixing unit 1 so as to facilitate flowing of the cleaner into the mixing chamber 16 through the cleaner inlet passage 142.

The sideward tubular portion 15 defines a sideward passage 151 extending sidewardly from and fluidly connected to the downward tubular passage 143.

Referring once again to FIGS. 1 to 3, the foaming gas supply unit 2 includes an insert tube section 21 having a portion that is removably and coaxially inserted into the foaming gas inlet passage 121, a foaming gas entering section 22 connected to and extending upwardly from the insert tube section 21, and a flow control section 23 connected to a distal portion of the foaming gas entering section 22. The insert tube section 21 defines a tubular passage 211 that is communicated with the mixing chamber 16. The insert tube section 21 has an outer diameter substantially equal to an inner diameter of the foaming gas inlet portion 12 of the mixing unit 1.

The foaming gas entering section 22 defines a gas entering passage 221 fluidly communicated with the tubular passage 211. The flow control section 23 extends in the horizontal direction from the distal end of the foaming gas entering section 22, and defines a flow control passage 231 extending in the horizontal direction and having a foaming gas inlet 232 through which the foaming gas enters the flow control passage 231. The foaming gas in the flow control passage 231 flows into the tubular passage 211 through the gas entering passage 221.

The foaming gas control valve 3 includes a control rod 31 extending through the flow control passage 231, and a knob 32 mounted to an end of the control rod 31 that is distal from the foaming gas entering section 22. A user can hold the knob 32 to move the foaming gas control valve 3 for controlling a flow amount of the foaming gas flowing into the foaming gas inlet passage 121. However, control of the air flow into the foaming gas inlet passage 121 is well known to those skilled in the art, so that the configuration of the foaming gas control valve 3 disclosed herein should not impose an implementation limitation of this invention.

Figure 5:
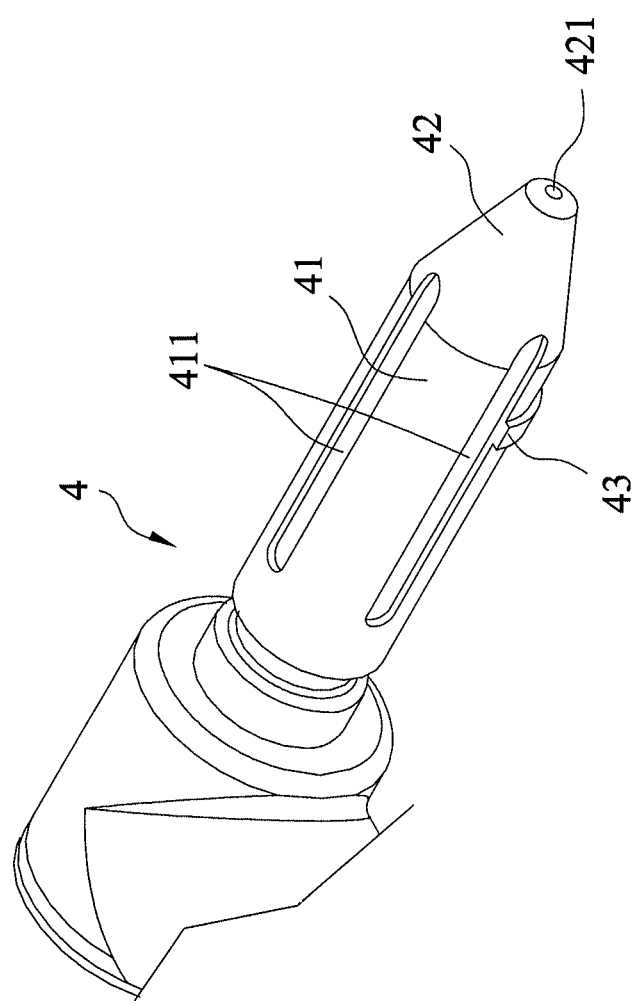
FIG. 5 is a perspective view of a steam jet unit of the embodiment.

Referring to FIGS. 1, 2 and 5, the steam jet unit 4 is removably and coaxially connected to the tubular passage 211 and the mixing unit 1, and includes a wide tube section 41 inserted into the upstream section 162 of the mixing chamber 16 in a loose fitting manner, a tapered section 42 tapering from the wide tube section 41 to the milk outlet nozzle 161, and an arcuated rib 43 projecting outwardly from a lower portion of an outer surface of the wide tube section 41 proximate to the tapered section 42. The wide tube section 41 is disposed in the tubular passage 211 and has an outer surface formed with a plurality of angularly spaced-apart longitudinal grooves 411 (see FIG. 1) for receiving a portion of the foaming gas coming from the gas entering passage 221. The tapered sect ion 42 protrudes into the downstream section 163 from the wide tube section 41, and defines a steam outlet nozzle 421 that is in fluid communication with the downstream section 163 of the mixing chamber 16 for supplying steam into the downstream section 163. The rib 43 is used to block milk from flowing from the mixing chamber 16 into the foaming gas inlet passage 121 which would otherwise pollute the foaming gas supply unit 2 and other components.

Referring again to FIGS. 1 to 3, the suction unit 5 includes an open end section 51 removably and coaxially inserted into the downward tubular passage 143 and having an arcuated cross section, and a suction section 52 connected to the open end section 51 for suctioning the milk and defining a suction passage 521 that is fluidly communicated with the downward tubular passage 143 through the open end section 51. The lower end of the suction section 52 is to be immersed into the milk.

One end of the cleaner supply pipe 6 is sleeved on the sideward tubular portion 15 of the mixing unit 1.

The control unit 7 includes a coupler 71 connected to the steam jet unit 4 and the cleaner supply pipe 6, a cleaner control valve 72 connected to the coupler 71, and a connecting plate 73 disposed between the coupler 71 and the cleaner control valve 72. The coupler 71 includes first and second tubes 711, 712 that are juxtaposed, and a third tube 713 that is fluidly connected to the second tube 712 and the steam jet unit 4. The first tube 711 is fluidly connected to the other end of the cleaner supply pipe 6 (i.e., the cleaner supply pipe 6 is fluidly connected to the cleaner inlet passage 142 and the cleaner control valve 72). The second tube 712 is adapted to connect a steam source to the third tube 713. The third tube 713 is perpendicular to the second tube 712, extends in the horizontal direction, and is connected to the wide tube section 41 of the steam jet unit 4, such that the steam from the steam source flows into the steam jet unit 4 through the second and third tubes 712, 713. The cleaner control valve 72 is used for controlling the cleaner to flow or to stop flowing into the cleaner inlet passage 142 through the first tube 711.

The discharge unit 8 includes a connection section 81 that has a portion removably and coaxially inserted into the foaming chamber 131, and a dispensing section 82 that is connected to the connection section 81. The connection section 81 and the dispensing section 82 cooperatively define a foamed milk dispensing passage 83 that has a constricted passage part 84 midway through the foamed milk dispensing passage 83. The constricted passage part 84 serves to delay the milk which is not well-foamed from directly leaving the discharge unit 8 so that the produced milk foam has a consistent quality.

When this invention is first put into operation, the cleaner control valve 72 blocks the cleaner from flowing into the first tube 711. At the same time, the steam is introduced continuously into the steam jet unit 4 via the second tube 712 and the third tube 713 of the coupler 71, is then discharged from the steam outlet nozzle 421 into the downstream section 163 of the mixing chamber 16, and is finally discharged from the milk outlet nozzle 161 of the mixing chamber 16 to the foamed milk dispensing passage 83 of the discharge unit 8. Since the mixing chamber 16 converges at the downstream section 163, the flowing speed of the steam at the downstream section 163 would increase to result in decrease of the pressure at the downstream section 163, so that milk is drawn up from the suction passage 521 of the suction unit 5, and flows through the downward tubular passage 143 and the milk inlet passage 141 into the upstream section 162 of the mixing chamber 16. In the meantime, a small amount of the foaming gas flows from the gas entering passage 221 into the upstream section 162 through the tubular passage 211. Then, the steam, the milk and the foaming gas are mixed up in the downstream section 163 into foamed milk, and the foamed milk is discharged from the milk outlet nozzle 161 into the foamed milk dispensing passage 83 for subsequent output from the foamed milk dispensing passage 83.

After sufficient milk foam is produced, the steam continues flowing for the purpose of discharging any residual milk foam. At this moment, the cleaner control valve 72 is controlled to allow the cleaner to flow through the first tube 711 of the coupler 71 and the cleaner supply pipe 6, and then flows into the downward tubular passage 143 through the sideward passage 151 of the sideward tubular portion 15. Since the milk inlet passage 141 and the cleaner inlet passage 142 are in fluid communication with the downward tubular passage 143, and the specific gravity of the cleaner is lighter than that of the milk, so that the cleaner would supplant the milk and be drawn up into the upstream section 162. Such filling of the cleaner would cause the milk disposed in the suction passage 521 of the suction unit 5 to fall down, away from the suction unit 5, and would expel the milk in the milk inlet passage 141, the cleaner inlet passage 142 and the downward tubular passage 143 to the downstream section 163 of the mixing chamber 16 for further discharge along with the steam from the milk outlet nozzle 161 to the foamed milk dispensing passage 83 and thereby leave the milk foaming device. After the cleaning process is completed, the milk foaming device will stop supply of the steam.

From the foregoing, the advantages of this invention are summarized as follows:

1) By virtue of the provision of the cleaner inlet passage 142 that is in fluid communication with the milk inlet passage 141, the residual milk in the downstream section 163 which is gathered from the milk inlet passage 141, the cleaner inlet passage 142 and the downward tubular passage 143 can be easily cleaned out via injection of the cleaner into the mixing unit 1;

2) Since the milk inlet passage 141 is disposed at a downstream section of the route through which the foaming gas and the cleaner will flow, the milk is blocked from polluting the part of the main body portion 11 of the mixing unit 1 near the upstream section of said route, so that subsequent cleaning of the main body portion 11 of the mixing unit 1 becomes much easier;

3) The cleaner control valve 72 may be configured to operate automatically such that the cleaner control valve 72 opens as soon as the production of the foamed milk is completed, so that the milk foaming device can be automatically cleaned after each milk foaming operation;

4) Since the mixing unit 1 intersects the foaming gas supply unit 2, the steam jet unit 4, the suction unit 5 and the discharge unit 8 at nearby locations arranged substantially in the horizontal direction, assembly and disassembly of the milk foaming device can be easily conducted, which facilitates cleaning, maintenance and replacement of the components of the milk foaming device; and 5) The design of the arcuate shape of the cleaner inlet passage 142 provides a relatively large space to facilitate flowing of the cleaner into the mixing chamber 16 so that the milk disposed in the suction passage 521 of the suction unit 5 would consequently and effectively fall down and away from the suction unit 5.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A self-cleaning milk foaming device comprising:
   a mixing unit including a mixing chamber for mixing steam, milk and a foaming gas, a milk inlet passage that is fluidly communicated with said mixing chamber for inputting the milk into said mixing chamber, a cleaner inlet passage that is fluidly communicated with said mixing chamber in proximity to said milk inlet passage for inputting a cleaner into said mixing chamber, and a foaming gas inlet passage that is fluidly communicated with said mixing chamber for inputting the foaming gas into said mixing chamber, said mixing chamber having a milk outlet nozzle for outputting a foamed milk, an upstream section that is distal from said milk outlet nozzle, and a downstream section that is disposed between said upstream section and said milk outlet nozzle, said downstream section being converged from said upstream section to said milk outlet nozzle, said milk inlet passage being situated between said cleaner inlet passage and said milk outlet nozzle, said foaming gas inlet passage being disposed at an upstream side of said milk inlet passage distal from said milk outlet nozzle;
   a steam jet unit removably connected to said mixing unit, and including a steam outlet nozzle that is fluidly communicated with said mixing chamber for supplying steam into said mixing chamber; and
   a control unit coupled to said steam jet unit and including a cleaner control valve for controlling the cleaner to flow or to stop flowing into said cleaner inlet passage;
   wherein said mixing unit further includes a downward tubular passage disposed beneath said mixing chamber, both of said cleaner inlet passage and said milk inlet passage being disposed between said mixing chamber and said downward tubular passage and having respective bottom ends fluidly and directly connected to said downward tubular passage.

2. The milk foaming device as claimed in claim 1, further comprising a cleaner supply pipe fluidly connected to said cleaner inlet passage and said cleaner control valve, said cleaner control valve is configured to operate automatically such that said cleaner control valve opens as soon as the production of the foamed milk is completed.

3. The milk foaming device as claimed in claim 1, wherein said cleaner inlet passage is situated between said foaming gas inlet passage and said milk inlet passage, said cleaner inlet passage and said milk inlet passage being fluidly communicated with said upstream section of said mixing chamber.

4. The milk foaming device as claimed in claim 3, wherein said cleaner inlet passage is arcuated around said milk inlet passage.

5. The milk foaming device as claimed in claim 3, wherein said steam jet unit further includes a wide tube section inserted into said upstream section in a loose fitting manner, a tapered section tapering from said wide tube section to said milk outlet nozzle, and a rib projecting outwardly from an outer surface of said wide tube section proximate to said tapered section, said wide tube section having a plurality of angularly spaced apart longitudinal grooves formed in said outer surface of said wide tube section, said tapered section having said steam outlet nozzle.

6. The milk foaming device as claimed in claim 1, further comprising a suction unit which includes an open end section removably inserted into said downward tubular passage and having an arcuated cross section, and a suction section connected to said open end section for suctioning the milk and defining a suction passage that is fluidly communicated with said downward tubular passage through said open end section.

7. The milk foaming device as claimed in claim 6, further comprising a cleaner supply pipe fluidly connected to said cleaner control valve, said mixing unit further including a sideward tubular portion that extends sideward from and is fluidly connected to said downward tubular passage, said cleaner supply pipe being connected fluidly to said sideward tubular portion.

8. The milk foaming device as claimed in claim 7, wherein said control unit further includes a coupler connected to said steam jet unit, said coupler including first and second tubes that are juxtaposed, and a third tube that is fluidly connected to said second tube and said steam jet unit, said second tube being adapted to connect a steam source, said first tube being fluidly connected to said cleaner supply pipe and said cleaner control valve.

9. The milk foaming device as claimed in claim 1, further comprising a foaming gas supply unit which includes an insert tube section removably inserted into said foaming gas inlet passage, and a foaming gas entering section connected to said insert tube section, said insert tube section defining a tubular passage that is communicated with said mixing chamber and being sleeved onto said steam jet unit, said foaming gas entering section defining a gas entering passage that is fluidly communicated with said tubular passage.

10. The milk foaming device as claimed in claim 9, further comprising a foaming gas control valve that is connected to said foaming gas supply unit for controlling a flow amount of the foaming gas flowing into said foaming gas inlet passage.

11. The milk foaming device as claimed in claim 1, wherein said mixing unit further includes a foaming chamber fluidly communicated with said milk outlet nozzle, said foaming chamber being larger in width than said milk outlet nozzle.

12. The milk foaming device as claimed in claim 11, further comprising a discharge unit which includes a connection section removably inserted into said foaming chamber, and a dispensing section connected to said connection section, said connection section and said dispensing section cooperatively defining a foamed milk dispensing passage that has a constricted passage part midway through said foamed milk dispensing passage.

\* \* \* \* \*